(12) United States Patent
Holman

(10) Patent No.: US 6,696,145 B2
(45) Date of Patent: Feb. 24, 2004

(54) GEL-COATED MATERIALS WITH INCREASED FLAME RETARDANCY

(75) Inventor: Mark E. Holman, Lewisville, NC (US)

(73) Assignee: Frisby Technologies, Inc., Advance, NC (US)

( * ) Notice: Subject to any disclaimer, the term of this patent is extended or adjusted under 35 U.S.C. 154(b) by 15 days.

(21) Appl. No.: 09/771,285

(22) Filed: Jan. 26, 2001

(65) Prior Publication Data

US 2001/0006865 A1 Jul. 5, 2001

Related U.S. Application Data

(62) Division of application No. 09/235,569, filed on Jan. 22, 1999, now Pat. No. 6,197,415.

(51) Int. Cl.$^7$ ................................................ B32B 5/22
(52) U.S. Cl. .................. 428/314.4; 428/317.9; 428/319.9; 428/327; 428/920; 428/921; 2/458
(58) Field of Search .................. 428/314.4, 317.9, 428/319.9, 327, 920, 921; 427/223, 227; 156/307.5; 442/136; 2/458

(56) References Cited

U.S. PATENT DOCUMENTS

| | | | | |
|---|---|---|---|---|
| 3,934,066 A | * | 1/1976 | Murch | 428/248 |
| 4,935,452 A | * | 6/1990 | Hill | 521/184 |
| 4,962,132 A | * | 10/1990 | Hill | 521/55 |
| 4,988,739 A | * | 1/1991 | Hill | 521/55 |
| 5,000,813 A | * | 3/1991 | Hill | 156/307.5 |
| 5,011,558 A | * | 4/1991 | Hill | 521/55 |
| 5,955,177 A | * | 9/1999 | Sanocki et al. | 428/210 |
| 5,955,188 A | * | 9/1999 | Pushaw | 428/320.2 |

FOREIGN PATENT DOCUMENTS

EP  0 062 298 A2  10/1982

OTHER PUBLICATIONS

Raymond R. Hindersinn and George M. Wagner, vol. 7: Fire Retardancy to Isotopic Labeling in Encyclopedia of Polymer Science and Technology, pp. 1–57 (1967).

* cited by examiner

*Primary Examiner*—Ula Ruddock
(74) *Attorney, Agent, or Firm*—Fish & Richardson P.C.

(57) ABSTRACT

The invention provides gel-coated materials that provide enhanced flame-, physical- and chemical-resistance to the foamed materials. The gel coatings can be created with a sol-gel process. Such treated materials can be used, for example, in the manufacture of articles of clothing that are to be used in environments in which fire and exposure to acids, bases or other chemicals which tend to corrode foamed materials is a potential hazard.

15 Claims, No Drawings

GEL-COATED MATERIALS WITH INCREASED FLAME RETARDANCY

CROSS-REFERENCE TO RELATED APPLICATIONS

This application is a divisional application of U.S. patent application Ser. No. 09/235,569, filed Jan. 22, 1999. now U.S. Pat. No. 6,197,415B1. The invention relates to gel-coated materials suitable for use in application is in which flame retardancy is a highly desired characteristic, and methods for fabricating such materials.

The invention relates to gel-coated materials suitable for use in applications in which flame retardancy is a highly desired characteristic, and methods for fabricating such materials.

BACKGROUND OF THE INVENTION

Materials desirably made fire resistant include polymeric materials, both natural and synthetic, woven and nonwoven fabrics, fibers, matting and batting. From a chemical structure perspective, low flammability can be achieved by introducing ring structures, and side groups which are not readily oxidized. For example, aromatic polyimides show excellent fire resistance, but are too costly for routine use.

A more common approach is to introduce one or more fire-retardant constituents to an inherently flammable material, such as in the case of a flammable polymer. The additive can be a fire-retardant monomer which is copolymerized to some degree with the inherently flammable monomer. Alternatively, the additive can be an unreactive material which is coated onto the material post-production, or molded or extruded with a polymeric material in a physical blend The inherently flammable material could also be reactively treated with a fire-retardant additive after polymer production, as in the chlorination of polymers such as polyethylene.

Compounds which have found use as fire-retardants include inorganic compounds such as antimony compounds, including antimony trioxide, antimony pentoxide, and sodium antimonate. Boron compounds such as zinc borate, boric acid and sodium borate. Alumina trihydrate and molybdenum oxides are also useful inorganic compounds.

Halogenated compounds have also been used, including decabromodiphenyl oxide, chlorendic acid, tetrabromophthalic anhydride, and similarly halogenated compounds. These halogenated compounds, especially chlorinated compounds, are often combined with the above-mentioned inorganic compounds, especially antimony-, iron-, cobalt-, nickel-, molybdenum-, and other metal-containing compounds, to produce synergistic fire-retarding effects.

SUMMARY OF THE INVENTION

The invention uses gel coatings on base materials to greatly increase the fire retardance of such materials. The gel coatings can be produced through sol-gel processing of foamed materials. The gel coating provides a degree of physical and flame protection for the materials thus produced. The oxidative resistance of such materials is unimproved as well. The coating is believed to minimize oxygen contact with the material. This can result in reduced incidence of oxidation from atmospheric oxygen for the materials, or any components contained within the materials, for example, reduced flammability for flammable contents, or reduced chemical oxidation for atmospheric oxidation-sensitive contents. The contents which can be included in the gel-coated materials include phase change materials in various forms.

The invention further provides a method for providing a gel coating on a material by a sol-gel process.

The invention provides flame-retardancy without altering the physical processing of the material, while undesirable alteration is commonly the case when inert halogen-containing additives are added. The gel-coated materials of the invention possess excellent light stability, in contrast to many halogen-based and phosphorus-based flame-retardant materials. The thermal stability of the gel-coated materials of the invention is at least as high as the untreated material; this is often not the case for halogen-based flame-retardant materials, which can produce corrosive hydrogen halides upon exposure to heat. The density of the gel-coated materials of the invention is lower than that of halogen-containing fire-retardant materials. The invention provides a gel-coated material having permanent fire-retardant properties.

The gel-coated materials of the invention are noncombustible, maintain their integrity upon exposure to flame, and seal the material completely from fire. The gel coatings are easily applied, and can easily be modified, with, for example, coloring agents. The gel coatings are repeatedly washable with commonly available solvents, and the fire-retardancy is retained upon such repeated washing.

The gel-coated materials of the invention possess excellent hydrolytic and chemical resistance, whereas phosphorus-containing flame-retardant materials generally do not.

Base materials generally described are adapted to be placed within articles of clothing including footwear and various articles of protective clothing designed for environments of extreme temperature and hazard from fire. According to the invention, a base material such as a foamed polymer, fiber, woven or nonwoven fabric, batting or matting is coated with a gel coating. The gel coating can also provide increased resistance to chemical reactants such as acids, bases and other chemicals that can damage or dissolve foamed materials. Such materials are ideal in protective clothing, for example, fire fighting suits. Gel-coated foamed materials are suitable for flame-resistant cushions used in aircraft, automobiles, furniture and other cushioned articles. Fabrics, matting and batting are other applications for which the invention is suited.

The gel-coated materials of the invention can also contain heat control agents, such as those which store latent heat. Such heat control agents include phase change materials, which can be integral to the base materials or gel coatings of the invention.

For the purposes of this specification, metal oxides, and metal alkoxides also include those materials which are calcinable (or otherwise oxidizible) to metal oxides, and metal alkoxides, as described below. For the purposes of this specification, calcination includes oxidation processes in general.

A flammable base material can be inherently flammable, or can become flammable upon the introduction of flammable materials in the interior or exterior of the base material.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions will control. In addition, the materials, methods and examples are illustrative only and not intended to be limiting.

DETAILED DESCRIPTION

The gel-coated materials of the invention feature base materials coated with a gel, specifically a gel produced by sol-gel processing. The gel coating provides flame-, physical- and chemical-resistances to the coated material, resulting in enhanced performances in critical applications. The materials which are coated with a gel can be fabrics, fibers, matting, batting or polymeric materials. Useful polymeric materials can be foamed polymeric materials, for example, foam insulation layers of footwear or garments.

The burning of polymeric materials is highly influenced by the density of materials in general. Most unexpanded plastic polymers have densities commonly in the range of at least 0.7 g/cm$^3$ and at most 1.5 g/cm$^3$. On the other hand, foamed polymeric materials have densities of about 0.03 g/cm$^3$, so that only a few percent (typically less than 5%) of the total volume of these foams is solid polymer. The presence of so much gas in the structure of a foamed polymer influences the burning characteristics greatly.

The exposure of a large surface area to the oxygen present in air results in an increased rate of burning. On the other hand, since the amount of potentially flammable material per unit volume is relatively small, the heat available for flame propagation per unit area is relatively low. Also, for thermoplastic foams such as polystyrene foam, rapid melting results from the heat of flames. This causes the foam to recede rapidly from the flame, and the spread of flame is minimized, or the material is self-extinguishing.

Thermoset foams, in contrast, are highly crosslinked. Flame does not cause them to melt appreciably, so that the material does not recede from the advancing flame front. If the thermoset foam is intrinsically flammable, a rapid ignition of the entire foam can ensue.

There are five fundamental ways to increase the fire-retardance of polymeric base materials: increase the crosslinking density of the polymeric base material to increase its decomposition temperature; replace material which can serve as fuel with material that cannot serve as fuel in the polymeric base material, by adding inert fillers, halogen substituents, or inorganic constituents; induce the polymeric base material to flow when ignited by interrupting the polymer backbone, thereby allowing the polymer to drip and recede from the flame front; introduce pathways which allow alternate means of decomposition, for example pathways which lead to carbon charring; and mechanical means such as a non-flammable skin bonded to the surface of the polymeric base material, covering the polymer with an intumescent or nonintumescent coating, or simply installing a sprinkler system proximate the polymeric base material.

Fire-resistant coatings are generally of two types, intumescent and nonintumescent. Intumescence is the expansion of a coating into a foamlike carbonaceous char upon heating. Continuous heating of intumescent coatings pyrolyzes them into heat-resistant carbonaceous foam-like coatings.

The coating used to coat the foamed polymeric materials of the present invention is a gel coating. Specifically, the gel is prepared by a process known as the sol-gel coating process. A colloid is a suspension in which the dispersed phase is not affected by gravitational forces, due to the dimensions of the dispersed phase (1–1000 nm). A sol is a colloidal suspension of solid particles in a liquid. A gel can be considered to be the agglomeration of these particles into a structure of macroscopic dimensions, such that it extends throughout the solution. It is, therefore, a substance that contains a continuous solid skeleton enclosing a continuous liquid phase.

Sol-gel processing according to this invention involves chemical processing of gel precursors to prepare a colloid. These gel precursors consist of metal atoms surrounded by ligands. The metal atoms and the ligands fall into wide classes described below.

Generally, chemical processing of the gel precursors involves hydrolysis and condensation reactions in which the ligands of the precursors are replaced by bonds to the ligands of other metal or metalloid elements. This process results in a growing network of metal or metalloid elements linked together, eventually forming a gel.

The gels for use in the invention can be prepared via reactions which use monomeric, metal oxides as gel precursors. Metal oxides for use in sol-gel processing are generally represented by $M(-OH_2)_n$ (aquo ligand), $M(-OH)_n$ (hydroxo ligand), and $M(=O)_n$ (oxo ligand), where M is the metal atom, and n depends on the coordination state of M. Metal oxides for use in such reactions include $TiO_2$, $ZrO_2$, $RuO_2$, $RuO_4$, $V_2O_5$, $WO_3$, $ThO_2$, $Fe_2O_3$, $MgO$, $Y_2O_3$, $HfO_2$, $Nb_2O_5$, $UO_2$, $BeO$, $CoO$, $NiO$, $CuO$, $ZnO$, $In_2O_3$, $Sb_2O_3$, $Al_2O_3$ and $SnO_2$. Mixtures of such oxides are also useful, such as $ZnO-TiO_2$, $TiO_2-Fe_2O_3$, $SnO_2-TiO_2$, $Nd_2O_3-TiO_2$, $Al_2O_3-Cr_2O_3$, $MgO-Al_2O_3$, $MgO-TiO_2$, $MgO-ZrO_2$, $ThO_2-UO_2$, $ThO_2-CeO_2$, $Bi_2O_3-TiO_2$, $BeO-Al_2O_3$, $TiO_2-Fe_2O_3-Al_2O_3$, $Al_2O_3-Cr_2O_3-Fe_2O_3$, $PbO-ZrO_2-TiO_2$, $ZnO-Al_2O_3-Cr_2O_3$, $Al_2O_3-Cr_2O_3-Fe_2O_3-TiO_2$, and $ThO_2-Al_2O_3-Cr_2O_3-TiO_2$. It is also within the scope of this invention to use dispersions or sols of the ceramic metal oxides in combination or admixture with dispersions or sols of one or more metal oxides which are unstable in normal air environment (such as $Li_2O$, $Na_2O$, $K_2O$, $CaO$, $SrO$, and $BaO$) and/or ceramic oxides having an atomic number of 14 or greater (such as $SiO_2$, $As_2O_3$, and $P_2O_5$), representative combinations including $Al_2O_3-Li_2O$, $TiO_2-K_2O$, $ZrO_2-CaO$, $ZrO_2-Al_2O_3-CaO$, $ZrO_2-SrO$, $TiO_2-BaO$, $B_2O_3-SiO_2$, $TiO_2-ZrO_2-BaO$, $Al_2O_3-Na_2O$, $TiO_2-SiO_2$, $MgO-SiO_2$, $Fe_2O_3-BaO$, $ZrO_2-SiO_2$, $Al_2O_3-As_2O_3$, $ZrO_2-P_2O_5$, $Al_2O_3-SiO_2$, $Al_2O_3-B_2O_3$, and $Al_2O_3-Cr_2O_3-SiO_2$.

Instead of using the precursor material in the form of dispersions or sols of the oxides, it is within the scope of the invention to use the precursor materials in the form of water soluble or dispersible inorganic or organic compounds which are calcinable, or otherwise oxidizible, to the corresponding metal oxide or metalloid oxide. These compounds representatively include many carboxylates and alcoholates, e.g., acetates, formates, oxalates, lactates, propylates, citrates, and acetylacetonates, and salts of mineral acids, e.g., bromides, chlorides, chlorates, nitrates, sulfates, and phosphates, selection of the particular precursor compound being dictated by availability and ease of handling. Representative calcinable precursor compounds useful in this invention include ferric chloride or nitrate, chromium chloride, cobalt nitrate, nickel chloride, copper nitrate, zinc chloride or carbonate, lithium propylate, sodium carbonate or oxalate, potassium chloride, beryllium chloride, magnesium acetate, calcium lactate, strontium nitrate, barium acetate, yttrium bromide, zirconium acetate, hafnium oxychloride, vanadium chloride, ammonium tungstate, aluminum chloride, indium iodide, titanium acetylacetonate, stannic sulfate, lead formate, bismuth nitrate, neodymium chloride, phosphoric acid, cerium nitrate, uranium nitrate, and thorium nitrate.

The sol-gels for use in the invention can also be prepared via reactions which use monomeric, metal alkoxide precursors. This class of compounds is represented by $M(OR)_n$, where M is a metal, OR is an alkoxide (an alkoxide with from one to six carbons which may be further substituted), and n is from 2 to 8, depending on the coordination state of the metal. The metals used in the metal alkoxide precursors are Ti, Cr, W, Th, Fe, Mg, Y, Zr, Hf, V, Nb, U, Be, Co, Ni, Cu, Zn, In, Sb, Al, Sn and Si. The alkoxy ligands are generally alkoxides with from one to six carbons such as methoxy, ethoxy, propoxy, butoxy, pentoxy, and hexoxy ligands, or substituted or unsubstituted aryloxy groups. oligomeric precursors can be used such as ethoxypolysiloxane (ethyl polysilicate), hexamethoxydisiloxane ($Si_2(OCH_3)_6$) and octamethoxytrisilioxane ($Si_3(OCH_3)_8$).

The monomeric, tetrafunctional alkoxysilane precursors are represented by the following formula.

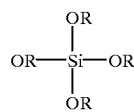

where RO is a $C_1$–$C_6$ substituted or unsubstituted alkoxy group, or a substituted or unsubstituted aryloxy group. Typical examples include methoxy, ethoxy, n-propoxy, n-butoxy, 2-methoxyethoxy, and phenylphenoxy groups. Ethoxypolysiloxane (ethyl polysilicate), hexamethoxydisiloxane ($Si_2(OCH_3)_6$) and octamethoxytrisilioxane ($Si_3(OCH_3)_8$) can also be used, as well as the cubic octamer ($Si_8O_{12}$)($OCH_3$)$_8$. Organically modified silicates having various organic ligands can be used, such as those formed by combining tetraalkoxysilanes with alkyl-or aryl-substituted and organofunctional alkoxysilanes. Organic functionality can be introduced to the alkoxy ligands with substituents such as —$(CH_2)_{n1}NH_2$, —$(CH_2)_{n1}NHCO$—O—$NH_2$, —$(CH_2)_{n1}S(CH_2)_{n2}CHO$, and like substituents, where n1 and n2 are from 0 to 6. Polymerizible ligands can also be employed, such as epoxides, to form organic networks in addition to an inorganic network. Choice of precursor can be made according to solubility or thermal stability of the ligands.

To produce gels with somewhat less dense structure, to impart more organic character to the gel, or to allow for derivitization, organotrialkoxysilanes (R'Si(OR)$_3$) or diorganodialkoxysilanes (R'$_2$Si(OR)$_2$) can be used as gel precursors. The groups R' need not be the same as each other on a given precursor molecule. Examples of such precursors are methyltriethoxysilane, methyltrimethoxysilane, methyltri-n-propoxysilane, phenyltriethoxysilane, and vinyltriethoxysilane.

Catalysts are optionally but generally present in sol-gel processing. Acids and bases are suitable catalysts for sol-gel processing as carried out in the invention. Such catalysts facilitate both hydrolysis and condensation reactions, and can play a role in product structures. Preferred catalysts include inorganic acids (e.g., hydrochloric, nitric, sulfuric and hydrofluoric acid), amines including ammonia and ammonium hydroxide, organic acids (e.g., acetic acid), bases (e.g., potassium hydroxide), potassium fluoride, metal alkoxides (e.g., titanium alkoxide, vanadium alkoxide). All other factors being equal, acid catalysis produces gels which are cross-linked to a lesser extent than gels produced by base catalysis. A suitable catalyst for the sol-gel processing reactions of the invention is nitric acid.

Sol-gel processing can take place in the presence of solvents. Suitable solvents include water, alcohols (e.g., methanol, ethanol), amides (e.g., formamide, dimethylformamide), ketones (e.g., acetone), nitrites (e.g., acetonitrile), and aliphatic or alicyclic ethers (e.g., diethyl ether, tetrahydrofuran, or dioxane). These solvents can facilitate hydrolysis reactions as described below, especially if the ligands present on the sol-gel precursor molecules are bulky, such as phenylphenoxy ligands.

Inasmuch as water is often a reactant involved in sol-gel processing reactions, as in the hydrolysis reaction described below, it is included in the list of solvents to the extent that water in excess of a stoichiometric minimum amount is provided. Solvents other than water are generally employed to prevent phase separation in those sol-gel processing reactions which involve water-immiscible components. Control over the concentration of the reactants is also provided through the use of a solvent.

The first reaction generally taking place is hydrolysis, in which the alkoxide ligands of the alkoxysilanes are replaced by hydroxide ligands, from water. This reaction is represented here.

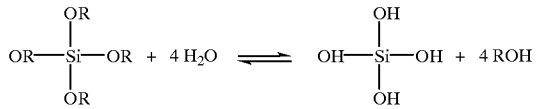

where RO is a $C_1$–$C_6$ substituted or unsubstituted alkoxy group, or substituted or unsubstituted aryloxy group. The product of this reaction is an alcohol, reducing the need for alcohol or other mutual solvents as the reaction proceeds. Since the reaction is reversible, the alcohol can also participate in reverse reactions, reesterification and transesterification. All substituents attached to silicon are labile, and populations of substituents will depend in an equilibrium sense on control exerted over the concentrations of alcohol and water, the type of catalyst used and the extent of reaction.

Under acid-catalysed hydrolysis conditions, the alkoxide ligand is likely to be protonated as a first step, making it a better leaving group as water attacks from the backside of the central silicon atom. Seemingly for this reason, steric effects of the ligands play a significant role in determining the rate of this reaction. Under base-catalysed hydrolysis, dissociation of water to produce hydroxide ion likely takes place. The hydroxide attacks the backside of the central silicon atom, displacing the alkoxide ion. Inductive effects of the ligands are likely to be important here since the silicon atom develops charge in the transition state.

The subsequent condensation reactions can either be between Si—OR and Si—OH or between two molecules of Si—OH to produce a silicate gel as shown in the following reactions.

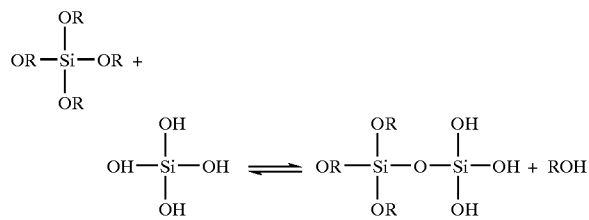

The mechanism of silicate gel formation is distinct from that of organic polymers, in that the silicic acid ($Si(OH)_4$)

polymerizes into discrete particles. These particles then aggregate into chains and networks. The resulting macroscopic structure of the gel can be characterized as either a dense network with well-defined solid-liquid interfaces, a uniformly porous network, or an open network.

This gel is then desirably applied to a base material, and dried to eventually produce a glassy material. Dried gels are referred to as xerogels or aerogels Xerogels are produced by evaporation of liquid, while aerogels are dried by supercritical extraction of solvent. During this phase of the process, consolidation of the gel occurs. This process is also referred to as curing. The rate of curing gives control over the porosity of the resulting gel coating.

The gel initially tends to shrink as liquid is removed, through removal of liquid at the surface of the gel. The amount of shrinkage that occurs initially is dependent both on how the gel is produced and how it is dried. Drying by evaporation of solvent produces xerogels which are denser than aerogels produced by supercritical extraction of liquid.

At pH values below about 2, hydrolysis reactions involve protonated alkoxide groups and the rate of hydrolysis is large compared to the rate of condensation. The supply of precursor monomers is essentially depleted at an early point in the condensation reaction. Resulting cluster-cluster aggregation leads to weakly branched structures. Above pH of about 7, hydroxide and $SiO^-$ ions are the reactive species in hydrolysis and condensation reactions, respectively. If at least stoichiometric ratios of water to gel precursor are used ($[H_2O]/[Si] \geq 4$), more compact and highly branched structures result as described in Brinker et al. *Sol-Gel Science,* Chapter 3.

Thus, gels produced through acid-catalysis are cross-linked to a lesser extent. Such gels shrink more during initial drying because the structures can interpenetrate each other more. The pores in such a gel are smaller, so that capillary pressure which is exerted during final stages of drying further compacts the structure. The resulting gel is characterized by an extremely fine texture.

The pores in gels produced by acid-catalysis and drying by evaporation range in size from 10 to 50 Å.

According to the invention, gel coatings of metal oxides, metalloid oxides or the compounds calcinable (or otherwise oxidizible) to such oxides (such as those listed above) are produced on the surface of a base material. The gel coatings desirably provide a continuous coating on the surface of the base material.

As an example, the base material can be a foamed polymeric material. This material can be hydrophobic, hydrophilic or amphipathic. Exemplary of acceptable polymers are polyurethane, polypropylene, butyl, silicone, cellulose acetate, neoprene, epoxy, polystyrene, phenolic, and polyvinyl chloride. Foams such as styrofoam are not particularly well suited for the gel-coatings of the invention, and are not preferred. The foamed material should not react appreciably with the sol used to produce the gel in such a way as to structurally weaken the foamed material. Limited chemical reaction with the surface of the foamed material may take place, and in fact may be beneficial in certain applications, for example, on silicon foam. Preferred are materials such as a moldable foamed organic plastic. The foamed materials need not be inherently flammable. Foams such as silicon foams are not inherently flammables but if a flammable material is contained within the interior, or on the surface of, a non-flammable foam, a gel coating is useful.

The gel coatings of the invention are equally useful with open- or closed cell foams. For applications in which the foam is desired to be breathable, an open cell foam is preferred. An open cell foam structure also allows for the possibility that the entire foam can become impregnated with the gel coating. In such cases, uncured sol can be removed by squeezing the open cell foam after it has been soaking in the sol to clear air passages and allow the foam to remain breathable. Open cell foams with particularly fine cell structure could become impermeable in this way, however, as the air passages could conceivably become solidified. Foams with closed cell structures will only have gel coatings on their exposed surfaces, since the uncured sol will not penetrate to the interior of a closed cell foam. The choice of open or closed cell foam is made based on the particular application. If a high level of flame resistance is necessary, an open cell foam is preferred, as it will absorb a much greater amount of sol than a closed cell foam. If the foam is required to remain relatively lightweight, a closed cell foam may be better, since its interior will remain as an uncoated foam. This also makes the bulk properties of gel-coated closed cell foams similar to those of uncoated closed cell foams, since the vast majority of the foam is unaffected by the coating, and its physical properties are largely retained.

The base material can also be a fabric. Suitable fabrics include those typically used for clothing materials, such as natural fabrics, including cotton, linen, wool, hemp, jute, ramie, silk, mohair, vicuna, and the like. Other fabrics include man-made fabrics such as organic polymer fabrics including rayon, viscose, acetate, azlon, acrylic, aramid, nylon, olefin, polyester, spandex, vinyon and the like. Such fabrics can be knitted, woven or nonwoven. The base material may also be the fibers or filaments of the materials listed above which are composed of fibers or filaments. In either case, the gel coating is applied in essentially the same way as described for polymeric materials and foamed polymeric materials.

Such base materials, in addition to themselves having a potential for flammability, may contain other desirable constituents which are independently flammable, and may render an otherwise nonflammable base material flammable by virtue of their flammability. In such cases, the gel-coated materials of the invention also provide protection against flame.

Such desirable constituents which may be present in a base material include materials which can absorb heat and protect an underlying material from overheating. Thermal energy is absorbed by the phase change of such materials without causing an increase in the temperature of these materials. Suitable phase change materials include paraffinic hydrocarbons, that is, straight chain hydrocarbons represented by the formula $C_nH_{n+2}$, where n can range from 13 to 28. Other compounds which are suitable for phase change materials are 2,2-dimethyl-1,3-propane diol (DMP), 2-hydroxymethyl-2-methyl-1,3-propane diol (HMP) and similar compounds. Also useful are the fatty esters such as methyl palmitate. Preferred phase change materials are paraffinic hydrocarbons.

Such constituents can be encapsulated, as is desired in the case of phase change materials. Such encapsulated constituents can further be encapsulated in microcapsules. The microcapsules can be made from a wide variety of materials, including polyethylene, polypropylenes, polyesters, polyvinyl chloride, tristarch acetates, polyethylene oxides, polypropylene oxides, polyvinylidene chloride or fluoride, polyvinyl alcohols, polyvinyl acetates, urethanes, polycarbonates, and polylactones. Further details on microencapusulation are to be found in U.S. Pat. Nos. 5,589,194 and 5,433,953. Microcapsules suitable for use in the base materials of the present invention have diameters from about 1.0 to 2,000 microns.

Such constituents can be introduced to the base materials pre- or post-manufacture, that is, before or after the material is formed in its final state. This depends on the nature of the constituent, and whether it can survive the manufacturing or processing of the base material and still retain its desired function, or whether the manufacturing or processing can impart new and desired functionality to the constituent.

For example, if a microencapusulated phase change material is to be introduced into a foamed polymeric material, it could be dispersed throughout the polymeric material prior to the foaming of the polymer. In some embodiments, the microencapusulated phase change material could be dispersed throughout the polymeric material so that it forms a product in which the microcapsules are individually surroundingly encapsulated and embedded within the base material. Alternatively, such phase change material could be pressed directly into the foam after it is made, for example, by pressing the microcapsules into the foam with an applicating instrument. Gel coatings can be formed on base materials containing various loadings of phase change containing additives. The fire-retardant capabilities of the sol-gel can suppress the flammability of any flammable phase change materials.

The invention also provides a method for producing gel-coated materials, by the method of sol-gel processing. In general, base materials as described above are mixed with a sol which is allowed to cure into a gel.

Sols are generally prepared by mixing metal-containing gel precursor and solvent together in a precursor/solvent ratio which can vary from about 3:1 to about 5:1 by volume. Preferably, the precursor/solvent ratio varies from about 3.5:1 to about 4.3:1. Separately, catalyst and water are mixed in a catalyst/water ratio which can vary from about 1:12 to about 1:22 by volume. The two solutions are mixed together with stirring.

As the mixture warms and subsequently cools, the onset and completion of reaction is indicated. At the completion of reaction, the mixture is contacted with a base material surface. The mixture can be sprayed onto the material, brushed onto the material, or the material can be dipped into the sol.

Spraying of the sol onto an article is however, less likely to result in a continuous coating on the base material surface. A sprayed sol is likely to cure more rapidly than a brushed sol, for example. In certain instances, this is a desirable situation. For example, if the material is particularly reactive with the sol, spraying may be the best way to avoid prolonged contact with the sol which would occur if the base material were soaked in, or brushed with a sol. If further materials are to be included, they can be included directly in the sol before curing creates a gel.

The invention will be further described in the following examples, which do not limit the scope of the invention described in the claims.

EXAMPLES

The following examples illustrate certain embodiments of the gel-coated materials of the invention, their properties, and methods of their manufacture.

Example 1

Preparation of a Gel-Coated Foamed Material

A gel-coated foamed silicon material was prepared. The procedure required handling materials that are hazardous to human health. Suitable protective equipment was worn and appropriate precautions were taken to prevent the inhalation of any hazardous solvents, and particular care was taken to avoid the inhalation or skin contact with nitric acid and tetraethyl orthosilicate. No open flames were allowed in the vicinity during the procedure. The reactions were carried out in a fume hood with a filter for volatile organic compounds. The operator wore protective clothing, latex gloves, protective goggles and a respirator for dust and volatile organic compounds. All transfers were one by pipette.

Ethanol (16.5 mL of 95% ethanol) and 63 mL of 98% tetraethyl orthosilicate (TEOS) were added to a 150 mL polypropylene or polymethyl propylene container, and mixed well. In a separate container, 20.4 mL of deionized water and 1.62 g of nitric acid were mixed. The acidic solution was added to the TEOS solution and stirred with a Teflon-coated stirring stick for 30 minutes. The mixture was observed to become warm and then cool as the reaction was completed. This material was placed in a shallow tray and a sample of open cell silicon foam was placed in the sol. The foam was soaked in the sol long enough to fully cover all surface, and then removed. Excess sol was removed by squeezing and wringing of the foamed material. Open cell foams may need to be squeezed while in the sol to ensure coverage of all exposed cell surfaces. The foam was left to cure overnight.

Gel-coated polyurethane was prepared similarly, and produced a somewhat more brittle coating, although the open cell structure of the foam was retained.

Example 2

Flammability Testing on Gel-Coated Foamed Material

Tests have been conducted on open-cell silicone foams. Foam samples were coated with sol-gel by dipping the foam into the liquid sol, squeezing the foam to ensure complete coverage inside the foam cells, removing the foam from the sol, blotting off the excess sol, and setting the cured foam aside to allow the gel coating to cure overnight. Open-celled foam structures were found to require less curing time. It was also discovered that slow curing (not accelerated by heat) resulted in less cracking. Faster cures gave more flexible gel coatings.

Both coated and uncoated foam samples were exposed to an open flame for 12 seconds. This open flame test was carried out as described in FSTM 191A, which is also similar to FAR part 25, Appendix F, Part I.

Although neither silicone foam sample burned, the uncoated foam became friable at the area of flame contact and crumbled into sand ($SiO_2$) when touched after cooling. When a single coating (approximately 1–2 microns) of sol-gel was applied and cured, there was some indication of discoloration, but the foam did not become friable and remained flexible.

Similar tests on polyurethane foams showed that an uncoated foam burned readily. A single gel coating also burned but at a much more controlled rate, and a double gel coating (second coating applied after curing of the first coating) resulted in a polyurethane foam that completely inhibited continuous burning when the flame was removed, although the foam did burn with the flame applied directly.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

For example, the gel coatings described herein can also be applied to fabrics, or individual natural and man-made fibers, thereby imparting fire-, physical-, and chemical-resistance to those materials. The application of the sol to fabrics or fibers would be undertaken according to methods which are analogous to those described for foamed polymeric materials.

What is claimed is:

1. A fire-resistant article of clothing comprising a gel-coated material, said gel-coated material comprising:
   a base material; and
   at least one layer of a metal oxide- or metal alkoxide-based gel forming a network on said base material, wherein the base material is selected from the group consisting of foamed polymeric material, woven fabric, nonwoven fabric, fiber, batting and matting, wherein the alkoxide can be functionalized or unfunctionalized, and wherein the gel-coated material is flame resistant.

2. The fire-resistant article of clothing of claim 1, wherein the article of clothing is selected from the group consisting of a jacket, pants, vest, hat and shoes.

3. The fire-resistant article of clothing of claim 1, further comprising encapsulated phase change material.

4. The fire-resistant article of clothing of claim 1, wherein the base material is an open cell foam.

5. The fire-resistant article of clothing of claim 1, wherein the base material is a closed cell foam.

6. The fire-resistant article of clothing of claim 1, wherein the base material is a hydrophilic foam.

7. The fire-resistant article of clothing of claim 1, wherein the base material is a hydrophobic foam.

8. The fire-resistant article of clothing of claim 1, wherein the base material is a hydrophobic foam.

9. The fire-resistant article of clothing of claim 1, further comprising a phase change material.

10. The fire-resistant article of clothing of claim 9, wherein the phase change material is contained in the base material.

11. The fire-resistant article of clothing of claim 9, wherein the phase change material is in encapsulated portions.

12. A fire-resistant seat cushion comprising a gel-coated material, said gel-coated material comprising:
    a base material; and
    at least one layer of a metal oxide- or metal alkoxide-based gel forming a network on said base material, wherein the base material is foamed polymeric material, wherein the alkoxide can be functionalized or unfunctionalized, and wherein the gel-coated material is flame resistant.

13. The fire-resistant seat cushion of claim 12, wherein the base material is an open cell foam.

14. The fire-resistant seat cushion of claim 12, wherein the base material is a closed cell foam.

15. Fire-resistant insulation material comprising a gel-coated material, said gel-coated material comprising:
    a base material; and
    at least one layer of a metal oxide- or metal alkoxide-based gel forming a network on said base material, wherein the base material is foamed polymeric material, wherein the alkoxide can be functionalized or unfunctionalized, and wherein the gel-coated material is flame resistant.

* * * * *